United States Patent Office 3,194,807
Patented July 13, 1965

3,194,807
PROCESS OF PREPARING PYRIMIDINE DERIVATIVES
Wilhelm Peter Seebode, Grangemouth, Scotland, and Charles Henry Vasey, Huddersfield, England, assignors to Imperial Chemical Industries Limited, London, England, a corporation of Great Britain
No Drawing. Original application Dec. 2, 1960, Ser. No. 73,227. Divided and this application Feb. 2, 1962, Ser. No. 170,865
Claims priority, application Great Britain, Dec. 21, 1959, 43,324/59
7 Claims. (Cl. 260—260)

This is a division of application Serial No. 73,227, filed December 2, 1960, now Patent Number 3,165,459.

This invention relates to a process for the manufacture of pyrimidine derivatives which possess useful anticonvulsant properties.

According to the invention we provide a process for the manufacture of pyrimidine derivatives of the formula:

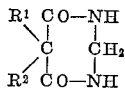

wherein $R^1$ is selected from the group consisting of phenyl and halophenyl, and wherein $R^2$ stands for an alkyl radical, which comprises reducing an imino-derivative of the formula:

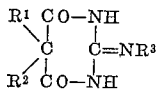

wherein $R^1$ and $R^2$ have the meaning stated above, and wherein $R^3$ is selected from the group consisting of hydrogen and the cyano radical, by reacting said iminoderivative with zinc and a mineral acid.

As a suitable halophenyl radical there may be mentioned, for example, a chlorophenyl radical. As a suitable value for $R^2$ there may be mentioned, for example, an alkyl radical of not more than 4 carbon atoms, for example the ethyl radical. As particularly suitable compounds for use as starting materials in the process of the invention there may be mentioned, for example, the compounds 5-ethyl-2-imino-5-phenylhexahydropyrimidine-4,6-dione and 2-cyanimino-5-ethyl-5-phenylhexahydropyrimidine-4,6-dione.

As a suitable form of zinc for use in the process of the invention there may be mentioned, for example, zinc dust, and as suitable mineral acids there may be mentioned, for example, hydrochloric acid or sulphuric acid. The said reaction may be carried out in the presence of a diluent or solvent, for example methanol or ethanol. The said reaction is preferably carried out under substantially anhydrous conditions using substantially anhydrous reactants and a substantially anhydrous diluent or solvent. The said reaction is conveniently carried out at a temperature between about 30° C. and 80° C. In one embodiment of the process of the invention the said mineral acid is added to a mixture comprising the said imino-derivative and zinc at about 35–50° C., for example 40–45° C., whereafter the reaction mixture is agitated at about 60–80° C., for example 70° C. In another embodiment of the process of the invention the reactants are in the proportions of 1 molecular proportion, for example 1 gm. mol., of the said imino-derivative, to 3.5–5 atomic proportions, for example 3.5–5 gm. atom, for example 4.6 gm. atom, of zinc, to 5–7 molecular proportions, for example 5–7 gm. mol., for example 6 gm. mol., of the said acid. In another embodiment of the process of the invention substantially anhydrous mineral acid is slowly added under substantially anhydrous conditions to an agitated, substantially anhydrous mixture of the imino derivative and zinc in methanol at about 40–45° C., whereafter the mixture is agitated and heated under reflux until said imino-derivative is substantially completely converted into said pyrimidine derivative whereafter the mixture is filtered, the filtrate mixed with water, the resultant mixture filtered, and the solid residue washed with water until said residue is acid-free.

As said, the pyrimidine derivatives which are manufactured according to the process of the present invention are useful as anticonvulsants, as described in United Kingdom Patent Specifications No. 666,027 and No. 734,512.

The invention is illustrated but not limited by the following examples:

Example 1

A suspension of 256 g. of 2-cyanimino-5-ethyl-5-phenylhexahydropyrimidine-4,6-dione and 275 g. of zinc dust in 1200 g. of methanol is stirred and heated under reflux at 60–65° C. 975 g. of concentrated hydrochloric acid are added during a period of 6 hours, during which time the temperature of the reaction mixture is raised to 70° C. 800 g. of aqueous methanol are removed from the mixture by distillation. 1250 g. of water are added to the residue and the mixture is heated at 70° C. during 1 hour, and then cooled. The mixture is filtered and the solid residue is crystallised from aqueous ethanol. There is thus obtained 5-ethyl-5-phenylhexahydropyrimidine-4,6-dione, M.P. 280–281° C.

The 2-cyanimino-5-ethyl-5-phenylhexahydropyrimidine-4,6-dione used as starting material may be obtained as follows:

92 g. of dicyandiamide and 264 g. of diethyl α-ethyl-α-phenylmalonate are added to a solution of 46 g. of sodium in 300 g. of methanol. The mixture is heated under reflux during 10 hours and the methanol is then removed by distillation. The residue is dissolved in 2000 g. of water and the solution is adjusted to pH 2.5 with dilute sulphuric acid. The mixture is filtered and the solid residue is crystallised from aqueous ethanol. There is thus obtained 2-cyanimino-5-ethyl-5-phenylhexahydropyrimidine-4,6-dione, M.P. 223° C.

Example 2

A suspension of 256 g. of 2-cyanimino-5-ethyl-5-phenylhexahydropyrimidine-4,6-dione and 325 g. of zinc dust in 600 g. of methanol is stirred and heated under reflux. A solution of 500 g. of hydrogen chloride in 1800 g. of methanol is added over a period of two hours. The mixture is heated under reflux for a further sixteen hours after which methanol is distilled off until the internal temperature rises to 95° C. The mixture is then filtered to remove unchanged zinc, and the filtrate is added to 5000 g. of water. The resulting mixture is filtered and the solid residue is washed with water and then with methanol. The solid is crystallised from aqueous ethanol. There is thus obtained 5-ethyl-5-phenylhexahydropyrimidine-4,6-dione, M.P. 280–281° C.

A similar preparation using sulphuric acid in place of methanolic hydrogen chloride also gives 5-ethyl-5-phenylhexahydropyrimidine-4,6-dione.

What we claim is:

1. A process for the manufacture of pyrimidine derivatives of the formula:

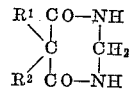

wherein $R^1$ is selected from the group consisting of phenyl and halophenyl, and $R^2$ stands for an alkyl radical, which comprises reacting an imino-derivative of the formula:

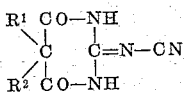

wherein $R^1$ and $R^2$ have the meanings stated above, with zinc and a mineral acid.

2. A process as claimed in claim 1 which is carried out in the presence of a liquid medium.

3. A process as claimed in claim 1 wherein the reaction is carried out under substantially anhydrous conditions using substantially anhydrous reactants and a substantially anhydrous liquid medium.

4. A process as claimed in claim 1 which is carried out at a temperature between about 30° C. and 80° C.

5. A process as claimed in claim 1 wherein the mineral acid is added to a mixture comprising the said imino-derivative and zinc at about 35–50° C., whereafter the reaction mixture is agitated at about 60–80° C.

6. A process as claimed in claim 1 wherein the reactants are in the proportions of 1 molecular proportion of the imino-derivative to 3.5–5 atomic proportions of zinc to 5–7 molecular proportions of the acid.

7. A process as claimed in claim 1 which comprises slowly adding substantially anhydrous mineral acid under substantially anhydrous conditions to an agitated, substantially anhydrous mixture of the imino-derivative, zinc and methanol at about 40–45° C., thereafter heating the agitated mixture under reflux until said imino-derivative is substantially completely converted into said pyrimidine derivative, thereafter filtering the mixture and mixing the filtrate with water, thereafter filtering the resultant mixture and washing with water the solid residue comprising the desired pyrimidine derivative until said residue is acid-free.

References Cited by the Examiner
UNITED STATES PATENTS
2,760,962  8/56  Vasey _____ 260—260

NICHOLAS S. RIZZO, *Primary Examiner.*